(12) United States Patent
Park

(10) Patent No.: US 11,250,852 B2
(45) Date of Patent: Feb. 15, 2022

(54) GENERATION OF TRIGGER RECOGNITION MODELS FOR ROBOT

(71) Applicant: LG ELECTRONICS INC., Seoul (KR)

(72) Inventor: Yongjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 16/853,685

(22) Filed: Apr. 20, 2020

(65) Prior Publication Data
US 2020/0402505 A1 Dec. 24, 2020

(30) Foreign Application Priority Data
Jun. 18, 2019 (KR) .......................... 10-2019-0072337

(51) Int. Cl.
*G10L 15/22* (2006.01)
*G10L 21/0232* (2013.01)
*G06N 3/08* (2006.01)
*G10L 13/047* (2013.01)
*G10L 15/16* (2006.01)
(Continued)

(52) U.S. Cl.
CPC ................ *G10L 15/22* (2013.01); *G06N 3/08* (2013.01); *G10L 13/00* (2013.01); *G10L 13/047* (2013.01); *G10L 15/063* (2013.01); *G10L 15/16* (2013.01); *G10L 21/0232* (2013.01); *G10L 2015/088* (2013.01); *G10L 2015/223* (2013.01)

(58) Field of Classification Search
CPC ....... G10L 15/22; G10L 15/063; G10L 15/25; G10L 13/00; G10L 13/047; G10L 15/16; G10L 21/0232; G10L 2015/088; G10L 2015/223; G10L 25/78; G10L 2015/0635; G06N 3/08; G05D 3/20; G06K 9/00248; G06K 9/00281; H04R 1/406; H04R 3/005
See application file for complete search history.

(56) References Cited

U.S. PATENT DOCUMENTS 9,311,527 B1 * 4/2016 Yin ........................... G06T 7/73
9,412,394 B1 * 8/2016 Yuasa ................. G10L 15/1822
(Continued)

FOREIGN PATENT DOCUMENTS

CN 111508475 A * 8/2020 ............. G10L 15/02
KR 1020180084469 7/2018
KR 1020190022109 3/2019

*Primary Examiner* — Mohammad K Islam
(74) *Attorney, Agent, or Firm* — Lee, Hong, Degerman, Kang & Waimey PC

(57) ABSTRACT

Provided are a trigger recognition model generating method for a robot and a robot to which the method is applied. A trigger recognition model generating method comprises obtaining an input text which expresses a voice trigger, obtaining a first set of voice triggers by voice synthesis from the input text, obtaining a second set of voice triggers by applying a first filter in accordance with an environmental factor to the first set of voice triggers, obtaining a third set of voice triggers by applying a second filter in accordance with a mechanism characteristic of the robot to the second set of voice triggers, and applying the first, second, and third sets of voice triggers to the trigger recognition model as learning data for the voice trigger. By doing this, a trigger recognition model which is capable of recognizing a new trigger is generated.

13 Claims, 7 Drawing Sheets

(51) Int. Cl.
*G10L 15/06* (2013.01)
*G10L 13/00* (2006.01)
*G10L 15/08* (2006.01)

(56) References Cited

U.S. PATENT DOCUMENTS

| | | | |
|---|---|---|---|
| 2017/0352351 A1* | 12/2017 | Kimura | B25J 11/001 |
| 2018/0374494 A1* | 12/2018 | Yamaya | G06K 9/00523 |
| 2019/0025400 A1* | 1/2019 | Venalainen | H04R 3/005 |
| 2019/0082255 A1* | 3/2019 | Tajiri | H04R 1/083 |
| 2019/0206400 A1* | 7/2019 | Cui | G05D 1/0231 |
| 2020/0092625 A1* | 3/2020 | Raffle | H04R 1/028 |
| 2020/0135198 A1* | 4/2020 | Mandl | G01S 7/003 |
| 2020/0151503 A1* | 5/2020 | Wang | G06K 9/325 |
| 2020/0225344 A1* | 7/2020 | Yoon | G01H 3/125 |
| 2020/0336846 A1* | 10/2020 | Rohde | G10L 25/78 |
| 2021/0016431 A1* | 1/2021 | Kim | G10L 15/22 |
| 2021/0056150 A1* | 2/2021 | Karandish | G06F 16/9535 |
| 2021/0141818 A1* | 5/2021 | Wu | G06N 5/022 |

\* cited by examiner

GENERATION OF TRIGGER RECOGNITION MODELS FOR ROBOT

CROSS-REFERENCE TO RELATED APPLICATION

Pursuant to 35 U.S.C. § 119(a), this application claims the benefit of earlier filing date and right of priority to Korean Patent Application No. 10-2019-0072337, filed on Jun. 18, 2019, the contents of which are all hereby incorporated by reference herein in their entirety.

BACKGROUND

1. Technical Field

The present disclosure relates to generation of a trigger recognition model for a robot, and more particularly, to a method for generating a trigger recognition model for a robot based on an input text, an electronic apparatus of processing the method, and a robot to which the method is applied.

2. Description of Related Art

Recently, robots which can be conveniently used in daily life have been actively developed. The robots help people's daily life through interaction with people at homes, schools, and public places. A voice recognition technique is widely utilized as an interface method for interaction between the robot and human.

An electronic device disclosed in the related art 1 (KR1020190022109A entitled "method for activating voice recognition service and electronic device for the same") activates a voice recognition service in response to a user input, processes a task for voice information input by the activated voice recognition service, analyzes the voice information to register at least one user wake word, and activates the voice recognition service in response to at least one sensed user wake word.

However, the electronic device of the related art 1 extracts a text representing a wake word from input voice information and registers the extracted text as a user wake word so that it is difficult to detect various utterances for the wake word. For example, when a user utters the same wake word in a different tone in a different environment, the activation of the voice recognition service is highly likely to fail. Further, according to the related art 1, a wake word recognition model which detects a registered user wake word is not considered.

According to a voice data providing method disclosed in a related art 2 (KR1020180084469A "method and apparatus for providing voice data"), when a user purchases or downloads contents, the user inputs a predetermined text to generate a synthesized voice for the text and combines a generated synthesized voice and a predetermined recorded voice to generate voice data.

However, according to the related art 2, the voice data does not reflect actual environmental factors or mechanism characteristics and cannot generate a model of recognizing the voice data.

SUMMARY OF THE INVENTION

One aspect of the present disclosure is to provide a trigger recognition model generating method which is capable of recognizing various utterances for the same trigger.

Another aspect of the present disclosure is to provide a trigger recognition model generating method which reflects the environmental factor and the mechanism characteristic step by step.

Another aspect of the present disclosure is to provide a robot which easily changes a trigger without inputting a voice trigger.

It will be appreciated by those skilled in the art that aspects to be achieved by the present disclosure are not limited to what has been disclosed hereinabove and other aspects will be more clearly understood from the following detailed description taken in conjunction with the accompanying drawings.

In order to achieve the above aspects, according to an exemplary embodiment of the present disclosure, the trigger recognition model generating method phonetically synthesizes an input text which represents a voice trigger to utilize the voice as learning data of the trigger recognition model.

To this end, at least one set of voice triggers generated by phonetically synthesizing the obtained input text may be provided to the trigger recognition model as learning data for a new voice trigger.

In order to achieve the above aspects, according to an exemplary embodiment of the present disclosure, the trigger recognition model generating method may generate at least one set of voice triggers by utilizing a filter in accordance with an environmental factor and a filter in accordance with a mechanism characteristic of the robot.

Specifically, a second set of voice triggers may be obtained by applying a first filter in accordance with an environmental factor to the first set of voice triggers. A third set of voice triggers may be obtained by applying a second filter in accordance with a mechanism characteristic of the robot to the second set of voice triggers.

In order to achieve the above aspects, according to an exemplary embodiment of the present disclosure, a robot may provide at least one set of voice triggers obtained from an external server to the trigger recognition model of the robot as learning data.

Specifically, the robot may obtain a response on a predetermined impulse output to obtain a filter in accordance with the mechanism characteristic. The robot may provide at least one set of voice triggers obtained by providing a response on the impulse output to the external server to the trigger recognition model as learning data.

Other embodiments, aspects, and features in addition those described above will become clear from the accompanying drawings, claims, and the detailed description of the present disclosure.

According to various exemplary embodiments of the present invention, the following effects can be acquired. The effects of the present disclosure are not limited to those mentioned below, and other effects not mentioned may be clearly understood by those skilled in the art from the following description.

First, a voice trigger obtained by phonetically synthesizing an input text is provided to a trigger recognition model as learning data so that various utterances for the same trigger may be recognized.

Second, the environmental factor and the mechanism characteristic of the robot are reflected step by step to enhance a trigger recognition precision of the trigger recognition model.

Third, a trigger recognition model suitable for the robot can be generated only by measuring an impulse response for reflecting the mechanism characteristic of the robot, so that the productivity may be improved.

Fourth, the user may freely change a trigger based on an input text or voice and operate the robot using a trigger changed in various environments.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
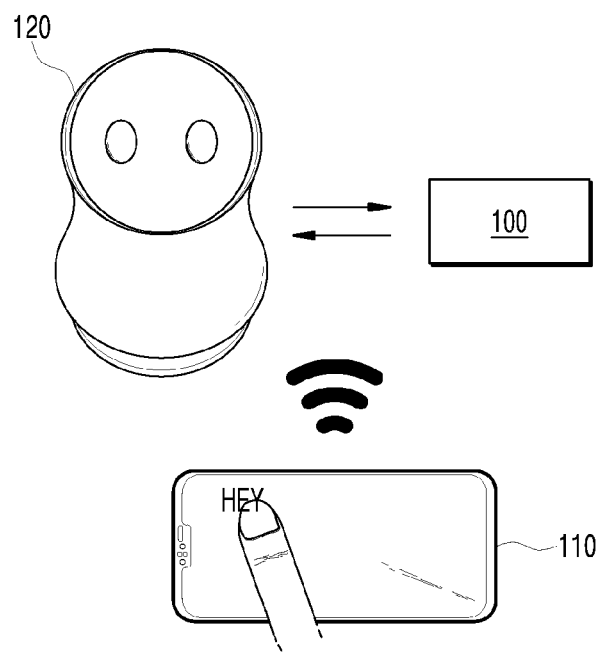
FIG. 1 is a view for schematically explaining generation of a trigger recognition model according to an exemplary embodiment of the present disclosure.

Hereinafter, an exemplary embodiment disclosed in the present specification will be described in detail with reference to the accompanying drawings in detail. Like reference numeral denotes like component and a redundant description will be omitted. In describing the exemplary embodiment disclosed in the present specification, when it is determined that a detailed description of a related publicly known technology may obscure the gist of the exemplary embodiment disclosed in the present specification, the detailed description thereof will be omitted.

FIG. 1 is a view for schematically explaining a process of generating a trigger recognition model according to an exemplary embodiment of the present disclosure.

In a normal operation, a robot 120 maintains an inactive state while waiting for a user's command to be received. A trigger refers to a command which wakes up the robot 120 which is in a waiting state to be transited to an active state. For example, the robot 120 recognizes a voice trigger spoken by the user to wake up from the waiting state.

When the user wants to change the voice trigger, the user may input a text which expresses a new voice trigger through a terminal 110. Here, the terminal 110 comprises various devices including a text input interface, such as a smart phone, a tablet, a notebook computer, and a PC. The user may input a text which expresses a new voice trigger using a touch screen of the robot 120.

An electronic device 100 which processes the trigger recognition model generating method (hereinafter, simply referred to as an electronic device) may obtain an input text from the terminal 110 or the robot 120 using various wired/wireless communication interfaces. The electronic device 100 may generate a trigger recognition model which is capable of recognizing a voice trigger corresponding to an obtained input text to provide the trigger recognition model to the robot 120. In another example, the robot 120 obtains an input text from the terminal 110 or the electronic device 100 to directly generate a trigger recognition model.

The robot 120 may recognize the changed trigger via the generated trigger recognition model. Hereinafter, the electronic device 100 according to an exemplary embodiment will be described in detail with reference to FIG. 2.

Figure 2:
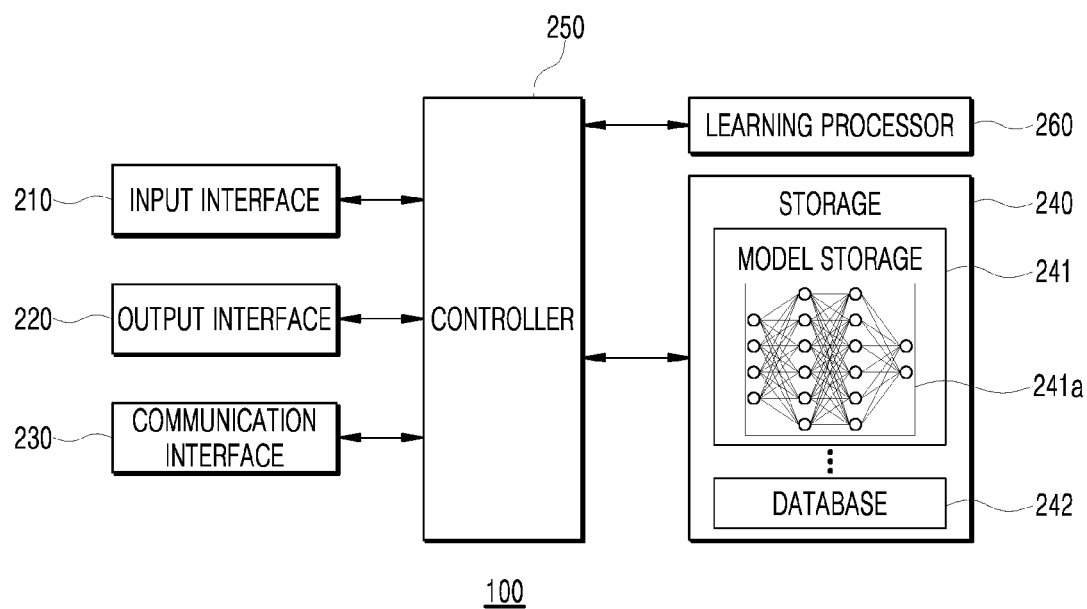
FIG. 2 is a block diagram illustrating a configuration of an electronic device which processes a trigger recognition model generating method according to an exemplary embodiment of the present disclosure.

FIG. 2 is a block diagram illustrating a configuration of an electronic device 100 which processes a trigger recognition model generating method according to an exemplary embodiment of the present disclosure.

The electronic device 100 may comprise an input interface 210, an output interface 220, a communication interface 230, a storage 240, a controller 250, and a learning processor 260. Components illustrated in FIG. 2 are not essential for implementing the electronic device 100 so that the electronic device 100 described in this specification may comprise more components or fewer components than the above-described components.

The input interface 210 may comprise a text input interface to which a text is input. The controller 250 generates a trigger recognition model based on an input text obtained by the input interface 210. The input interface 210 may additionally comprise a microphone which obtains an impulse response in accordance with a mechanism characteristic. The impulse response in accordance with the mechanism characteristic configures filter data in accordance with the mechanism characteristic.

The output interface 220 which generates an output related to vision or auditory may comprise a speaker. The output interface 220 may output a predetermined impulse under the control of the controller 250. The controller 250 may control the input interface 210 to obtain a response for the impulse output from the output interface 220.

The communication interface 230 may comprise one or more wired/wireless communication modules which enable the communication between the electronic device 100 and a terminal device including a communication module. The communication interface 230 may comprise a wired communication module, a mobile communication module, and a near-field communication module.

The communication interface 230 may communicate with the terminal 110 or the robot 120 to receive an input text which expresses a voice trigger. Additionally, the communication interface 230 may communicate with the terminal 110 or the robot 120 to receive a mechanism characteristic impulse response.

The electronic device 100 is a server device and the controller 250 receives an input text which expresses a voice trigger and filter data in accordance with a mechanism characteristic from the terminal via the communication interface 230 to generate a trigger recognition model. In this case, the communication interface 230 corresponds to the input interface 210 which obtains the input data and the filter data. The controller 250 may transmit the generated trigger recognition model to the robot 120 through the communication interface 230.

The storage 240 may comprise a model storage 241 and a database 242.

The model storage 241 may store the trigger recognition model. The model storage 241 stores a trigger recognition model (or an artificial neural network 241*a*) which is being trained or trained through the learning processor 260 and when the trigger recognition model is updated as a training result, the model storage 241 stores the updated model. If necessary, the model storage 241 may store the trained trigger recognition model by dividing into a plurality of versions depending on a training timing or a training progress. Further, the model storage 241 may store a voice synthesis model for synthesizing one set of voice triggers, from the input text.

The trigger recognition model is an artificial intelligence learning model which is trained using an artificial neural network and the robot 120 may recognize the voice trigger spoken by the user through the trigger recognition model. Here, the artificial neural network may comprise various learning models such as machine learning, various types of neural networks, genes, deep-learning, a classification algorithm, a recurrent neural network (RNN), and a bidirectional recurrent deep neural network (BRDNN). Hereinafter, the artificial neural network will be described.

An artificial neural network (ANN) is a data processing system modelled after the mechanism of biological neurons and interneuron connections, in which a number of neurons, referred to as nodes or processing elements, are interconnected in layers. Artificial neural networks are models for use in machine learning, which may comprise statistical learning algorithms inspired by biological neural networks (particularly of the brain in the central nervous system of an animal) in machine learning and cognitive science. More specifically, artificial neural networks may refer to models in general, where artificial neurons (nodes), forming a network through synaptic interconnections, acquire problem-solving capability by adjusting the strengths of synaptic interconnections through learning.

The terms 'artificial neural network' and 'neural network' may be used interchangeably herein.

An artificial neural network may comprise a number of layers, each of which may comprise a number of neurons. Furthermore, the artificial neural network may comprise a synapse connecting one neuron to another neuron.

The artificial neural network may be defined by the following three factors: (1) a connection pattern between neurons on different layers; (2) a learning process which updates synaptic weights; and (3) an activation function generating an output value from a weighted sum of inputs received from a previous layer.

Examples of the artificial neural network model include, but are not limited to, a deep neural network (DNN), a recurrent neural network (RNN), a bidirectional recurrent deep neural network (BRDNN), a multilayer perception (MLP), and a convolutional neural network (CNN).

In the present specification, the term 'layer' may be used interchangeably with 'layer'.

An artificial neural network may be classified as a single-layer neural network or a multi-layer neural network based on the number of layers therein.

In general, a single-layer neural network may comprise an input layer and an output layer.

In general, a multi-layer neural network may comprise an input layer, one or more hidden layers, and an output layer.

The input layer is a layer that receives data from some an external source, and the number of neurons in the input layer is identical to the number of input variables. Also, the hidden layer is located between the input layer and the output layer, and can receive signals from the input layer, extract features, and feed the extracted features to the output layer. The output layer receives a signal from the hidden layers and outputs an output value based on the received signal. Input signals between neurons are multiplied by corresponding connection strengths (synaptic weights) and summed together, and if this sum exceeds a threshold value of a corresponding neuron, the neuron is activated and can output an output value obtained through an activation function.

Furthermore, the deep neural network that includes a plurality of hidden layers between an input layer and an output layer may be the most representative type of artificial neural network enabling deep learning, which is one of machine learning techniques, deep learning.

The term 'deep learning' may be interchangeably used herein with the term 'deep learning'.

An artificial neural network can be trained using training data. Training may refer to the process of determining parameters of the artificial neural network by using the training data, in order to perform tasks such as classification, regression analysis, and clustering of input data. Such parameters of an artificial neural network may include a synaptic weight and a bias applied to a neuron. An artificial neural network trained using training data can classify or cluster input data according to a pattern within the input data. Throughout the present specification, an artificial neural network trained using training data may be referred to as a trained model. The trained model may be used for inferring a result value with respect to new input data rather than training data.

The artificial neural network 241*a* illustrated in FIG. 2 is only one example of artificial neural networks including a plurality of hidden layers, but the trigger recognition model of the present disclosure is not limited thereto. The artificial neural network 241*a* may be implemented by hardware, software, or a combination of hardware and software. When a part or all of the artificial neural network 241*a* is implemented by the software, one or more commands which configure the artificial neural network 241*a* may be stored in the storage 240.

The database 242 stores input data obtained from the input interface 210, learning data (or training data) used to train a model, and a training history of the model. The input data stored in the database 242 may be not only data which is processed to be suitable for the model learning but also input data itself which is not processed.

The database 242 may store various data used to generate a trigger recognition model. The database 242 may store a plurality of application programs operated in the electronic device 100, applications, and data and commands for an operation of generating a trigger recognition model. For example, the database 242 may store at least one set of voice triggers provided as learning data for generating a trigger recognition model. For example, the database 242 may store input texts obtained by the input interface 210 or the communication interface 230 and filter data in accordance with a mechanism characteristic. For example, the database 242 may store filter data in accordance with an environmental factor. The filter data in accordance with the environmental factor may comprise a room impulse response filter and a noise filter. At least some of application programs may be downloaded through wireless communication.

The controller 250 performs a process of generating a trigger recognition model based on the input text obtained by the input interface 210 or the communication interface 230 and the filter data in accordance with a mechanism characteristic. The controller 250 corresponds to a controller which controls the above-described components in various manners. The controller 250 may comprise one or more processors. The storage 240 may comprise memory that is coupled to the one or more processors of the controller 250 and provides the one or more processors with instructions which when executed cause the one or more processors to process the procedures for generating a trigger recognition model.

Specifically, the controller 250 may control the input interface 210 or the communication interface 230 to obtain an input text which expresses a voice trigger. The controller 250 may obtain a first set of voice triggers by voice synthesis from the obtained input text. The controller 250 may apply a first filter in accordance with the environmental factor to the first set of voice triggers to obtain a second set of voice triggers. The controller 250 may apply a second filter in accordance with the mechanism characteristic of a robot to the second set of voice triggers to obtain a third set of voice triggers. The controller 250 may apply the first, second, and third sets of voice triggers to the trigger recognition model stored in the storage 240 as learning data for the voice trigger. The controller 250 provides the first, second, and third sets of voice triggers to the trigger recognition model as learning data and controls the trigger recognition model to learn the learning data. The controller 250 generates the trigger recognition model which learns the first, second, and third sets of voice triggers as a new trigger recognition model for the input text and provides the generated trigger recognition model to the robot 120. The controller 250 may control the storage 240 to store the first, second, and third sets of voice triggers in the storage 240.

The learning processor 260 learns the trigger recognition model configured by an artificial neural network using the learning data. Specifically, the learning processor 260 repeatedly trains the artificial neural network using various learning techniques to determine optimized model parameters of the artificial neural network for recognition of the trigger. For example, the learning data comprises at least one set of voice triggers.

The learning processor 260 may be configured to receive, classify, store, and output information to be used for data mining, data analysis, intelligent decision making, and machine learning algorithms and techniques. The learning processor 260 may comprise at least one memory configured to store data which is received, detected, sensed, generated, defined in advance, or output from another component or device through the communication interface 230 or the input interface 210.

The learning processor 260 may comprise a memory which is combined or implemented in the electronic device 100. In some exemplary embodiments, the learning processor 260 may be implemented using the storage 240. Selectively or additionally, the learning processor 260 may be implemented using a memory related to the electronic device 100, such as an external memory which is directly coupled to the electronic device 100 or a memory maintained in a device which communicates with the electronic device 100. In another example, the learning processor 260 may be implemented using a memory maintained in a cloud computing environment or other remote memory locations accessible by the electronic device 100 via a communication method such as a network.

In general, the learning processor 260 may be configured to store data in one or more databases to identify, index, categorize, manipulate, store, search, and output data in order to be used for supervised or non-supervised learning, data mining, predictive analysis, or used in the other machine. Here, the database may be implemented using a storage 240, a storage 740 of the robot 120, a memory maintained in a cloud computing environment or other remote memory locations accessible by the electronic device 100 via a communication method such as a network.

Information stored in the learning processor 260 may be used by a controller 250 or one or more controllers of the electronic device 100 using an arbitrary one of different types of data analysis algorithms and machine learning algorithms. Examples of algorithm include k-nearest neighbor systems, fuzzy logic (for example, likelihood theory), neural networks, Boltzmann machines, vector quantization, pulse neural networks, support vector machines, maximum margin classifiers, hill climbing, induction logic system Bayesian network, Petri net (for example, a finite state machine, a millimachine, a Moore finite state machine), a classifier tree (for example, a perceptron tree, a support vector tree, a Markov tree, a decision tree forest, an arbitrary forest), decoding models and systems, artificial fusion, sensor fusion, image fusion, reinforcement learning, augmented reality, voice recognition, pattern recognition, and an automated plan.

The learning processor 260 may train the artificial neural network 241a using training data or a training set. The learning processor 260 immediately may obtain data which is obtained by pre-processing input data obtained by the controller 250 through the input interface 210 to train the artificial neural network 241a or obtain the pre-processed input data stored in the database 242 to train the artificial neural network 241a.

Specifically, the learning processor 260 repeatedly trains the artificial neural network 241a using various learning techniques described above to determine optimized model parameters of the artificial neural network 241a. That is, the learning processor 260 repeatedly may train the artificial neural network 241a using the training data to generate a trigger recognition model.

The trigger recognition model may be mounted in the electronic device 100 to deduce the result value or may be transmitted to the other device such as the robot 120 through the communication interface 230 to be mounted. Further, when the trigger recognition model is updated, the updated model may be transmitted to the other device such as the robot 120 via the communication interface 230 to be mounted.

Figure 3:
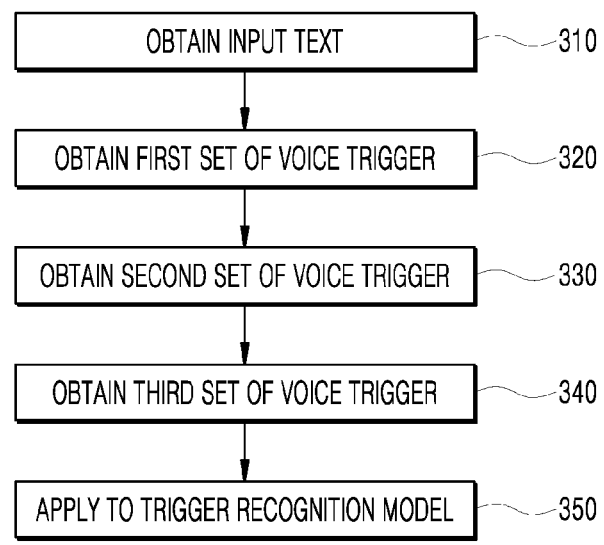
FIG. 3 is a flowchart illustrating a process of generating a trigger recognition model according to an exemplary embodiment of the present disclosure.

FIG. 3 is a flowchart illustrating a process of generating a trigger recognition model according to an exemplary embodiment of the present invention.

A trigger recognition model generating method for a robot comprises a step 310 of obtaining an input text which expresses a voice trigger, a step 320 of obtaining a first set of voice triggers by voice synthesis from the input text, a step 330 of obtaining a second set of voice triggers by applying a first filter in accordance with an environmental factor to the first set of voice triggers, a step 340 of obtaining a third set of voice triggers by applying a second filter in accordance with a mechanism characteristic of the robot to the second set of voice triggers, and a step 350 of applying the first, second, and third sets of voice triggers to the trigger recognition model as learning data for the voice trigger.

A user who wants to change a trigger of the robot 120 inputs a text which expresses a new trigger via the terminal 110 or the robot 120.

In the step 310, the controller 250 may control the input interface 210 or the communication interface 230 to obtain an input text which expresses a voice trigger. The voice trigger which is a command which activates the robot 120 is a voice command which wakes up the inactive robot 120 to change the inactive state of the robot to an active state in which the command of the user can be recognized.

In the step 320, the controller 250 obtains the first set of voice triggers from the input text obtained in the step 310 by the voice synthesis. The first set of voice triggers is a set of voice triggers which is generated by changing synthesis conditions for the same input text.

The synthesis condition may be related to a height, a magnitude, a timbre, an intonation, and a tone of a synthesized voice. For example, the synthesis condition comprises an age, a gender, and an emotional condition. For example, the first set of voice triggers generated in the step 320 is one set of original sounds obtained by phonetically synthesizing original pronunciation of letters of the input text with various combinations of the age, the gender, and the emotion in accordance with a synthesis condition.

To this end, in the step 320, the controller 250 may generate the first set of voice triggers from the input text using an end-to-end neural network-based voice synthesis model. An exemplary voice synthesis model will be described below with reference to FIG. 4.

In the step 330, the controller 250 obtains the second set of voice triggers by applying a first filter in accordance with the environmental factor to the first set of voice triggers obtained in the step 320. The storage 240 may store the first filter in accordance with the environmental factor. In the step 330, the controller 250 may use the first filter in accordance with the environmental factor stored in the storage 240.

The voice trigger spoken by the user is influenced by the environmental factor to be input to the trigger recognition model. Therefore, in order to generate the trigger recognition model, the environmental factor needs to be reflected at the time of generating the voice trigger.

The environmental factor comprises acoustic properties of a space, such as echoes and resonance of a space.

The first filter in accordance with the environmental factor may comprise a room impulse response filter. The controller 250 may convolute the room impulse response filter on the first set of voice triggers in the step 330 to obtain the second set of voice triggers. Here, the room impulse response filter is a filter representing a response on the predetermined impulse measured by at least one combination of a microphone position and a speaker position. That is, the room impulse response filter is an audio filter which measures a response on a predetermined impulse measured by various combinations of positions of a reference microphone and a reference speaker in various spaces. When a tap of the room impulse response is sufficiently long (for example, 5 seconds or longer), the room impulse response may represent the acoustic property of the space.

Further, the environmental factor may comprise noises which may be generated in the surroundings.

The first filter in accordance with the environmental factor may comprise a noise filter. The controller 250 may convolute the noise filter on the first set of voice triggers in the step 330 to obtain the second set of voice triggers. Here, the noise comprises noises measured in various spaces and virtual noises. The noise filter comprises a noise filter which is generated based on a noise which can be generated in an actual life, such as a babble noise. The noise filter further comprises a noise filter generated from at least one of a virtual white noise or a virtual brown noise. In the step 330, the noise filter may adjust a volume of each noise to be applied at various signal to noise ratios (SNR).

In the step 340, the controller 250 obtains a third set of voice triggers by applying a second filter in accordance with the mechanism characteristic of the robot to the second set of voice triggers obtained in step 330. The communication interface 230 may receive the second filter in accordance with the mechanism characteristic of the robot from the robot 120. In the step 340, the controller 250 may use the second filter in accordance with the mechanism characteristic received through the communication interface 230.

The voice trigger spoken by the user is influenced by the mechanism characteristic of the robot which recognizes the voice trigger while being input to the trigger recognition model. The mechanism characteristic of the robot is a mechanism characteristic of the robot which influences the voice recognition and comprises frequency distortion and an echo characteristic of the inside of the mechanism. The mechanism characteristic of the robot may vary by factors such as a physical structure or a material of the robot and a position of an embedded microphone.

The second filter in accordance with the mechanism characteristic of the robot comprises a mechanism characteristic impulse response filter. In the step 340, the controller 250 convolutes the mechanism characteristic impulse response filter on the second set of voice triggers obtained in the step 330 to obtain the third set of voice triggers.

The mechanism characteristic impulse response filter is a filter representing a response on a predetermined impulse output from speakers disposed in different directions with different distances relative to a current position of the robot. The mechanism characteristic impulse response is a response obtained by the predetermined impulse which is output from the speaker disposed in different directions with different distances relative to the current position of the robot to reach the microphone. When the tab of the response for the predetermined impulse is sufficiently long (for example, 5 seconds or longer), the mechanism characteristic impulse response filter may reflect not only the frequency distortion, but also the echo characteristic in the mechanism. For example, the controller 250 may play a sine sweep through speakers disposed in various directions with various distances relative to the current position of the robot and deconvolute the original sweep from the sound recorded in the microphone of the robot to obtain a response for the predetermined impulse.

In the step S350, the controller 250 may apply the first, second, and third sets of voice triggers to a trigger recognition model as learning data for the voice trigger expressed by the input text obtained in the step 310. That is, the controller 250 may apply the first set of voice triggers obtained in the step 320, the second set of voice triggers obtained in the step 330 and the third set of voice triggers obtained in the step 340 to the trigger recognition model as learning data.

The controller 250 may use various combinations of the first set of voice triggers, the second set of voice triggers, and the third set of voice triggers as learning data of the trigger recognition model. For example, it is assumed that the first set of voice triggers comprises 100 samples generated from the input text by voice synthesis and 100 room impulse responses and 100 noises generated by various combinations of positions of the microphone and the speaker are provided for the first filter used to generate the second set of voice triggers. In this case, when the first set of voice triggers and the second set of voice triggers are combined, 1000000 learning data may be generated. Additionally, for example, when it is assumed that 10 combinations of the direction and the distance of the speaker are provided for the second filter used to generate the third set of voice triggers, finally, 10000000 learning data may be generated.

The trigger recognition model may learn the learning data provided in the step 350 to recognize the input text input in the step 310 as a new trigger. Therefore, it is possible to generate the trigger recognition model which recognizes a new trigger from the input text without having data recorded in various spaces by various people. Further, in the steps 330 and 340, the environmental factor and the mechanism characteristic of the robot are reflected step by step to improve the accuracy of recognizing a trigger of the trigger recognition model. Moreover, a trigger recognition model suitable for the robot 120 can be generated only by measuring an impulse response for reflecting the mechanism characteristic of the robot 120, so that the productivity may be improved.

Figure 4:
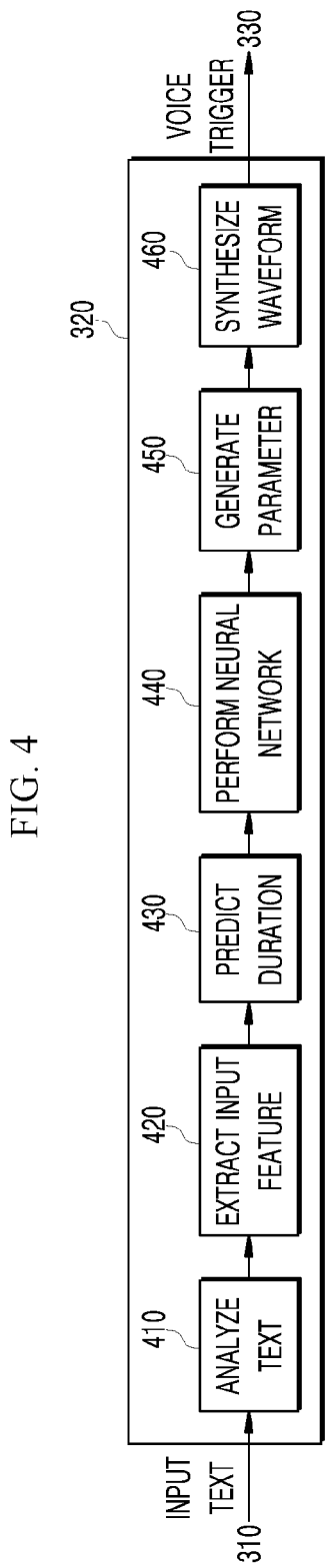
FIG. 4 is a flowchart schematically illustrating a voice synthesis process according to an exemplary embodiment of the present disclosure.

FIG. 4 is a flowchart schematically illustrating a voice synthesis process according to an exemplary embodiment of the present disclosure.

The input text obtained in the step 310 is provided to the step 330 as a first set of voice triggers via the voice synthesis process in step 320.

During an exemplary voice synthesis process, the input text may be subjected to a text analysis step 410, an input feature extracting step 420, a duration predicting step 430, a neural network step 440, a parameter generating step 450, and a waveform synthesis step 460 for the purpose of voice synthesis.

In the text analysis step 410, the input text may be analyzed to be classified into pronunciation units such as syllables and phonemes.

In the input feature extracting step 420, a feature applicable to the input text may be extracted. The input feature may be features which affect the timbre and the tone of the input text, such as the age, the gender, and the emotion. For example, the input feature may comprise a spectrum feature, a binary feature, and a numerical feature.

In the duration predicting step 430, a pronunciation duration of phonemes and syllables and a rest time between phonemes and between syllables may be predicted based on the extracted input features.

In the neural network step 440, the extracted input feature may be input for every frame to output a series of voice parameter vectors by an input layer, a hidden layer, and an output layer.

In the parameter generating step 450, age, gender, and emotion information and a voice parameter such as a timbre or a tone thereby may be generated from the series of voice parameter vectors obtained through the neural network.

In the waveform synthesis step 460, the voice signal may be synthesized in accordance with the generated voice parameter to generate a set of voice triggers.

The above-described voice synthesis process is an exemplary process and various techniques of synthesizing the voice from the text may be used.

Figure 5:
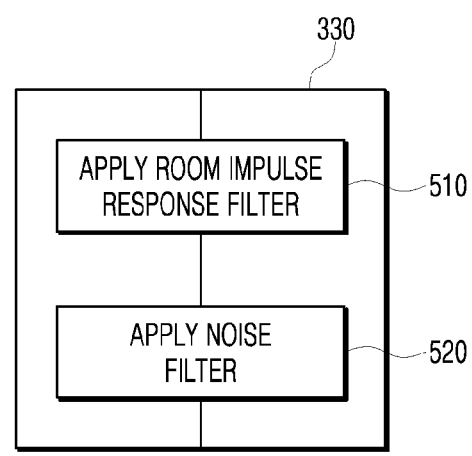
FIG. 5 is a view for explaining a filter in accordance with an environmental factor according to an exemplary embodiment of the present disclosure.

FIG. 5 is a view for explaining a filter in accordance with an environmental factor according to an exemplary embodiment of the present disclosure.

Referring to FIG. 3 described above, in the step 330, the controller 250 obtains the second set of voice triggers by applying the first filter in accordance with the environmental factor to the first set of voice triggers obtained in the step 320.

The first filter in accordance with the environmental factor may comprise a room impulse response filter to reflect an acoustic characteristic of the space. In the step 510, the controller 250 may convolute the room impulse response filter on the first set of voice triggers obtained in step 320 to obtain the second set of voice triggers. Here, the room impulse response filter is a filter representing a response on the predetermined impulse measured by at least one combination of a microphone position and a speaker position.

The first filter in accordance with the environmental factor may comprise a noise filter to reflect a noise which may be generated in the vicinity of the robot. In the step 520, the controller 250 may convolute the noise filter on the first set of voice triggers obtained in the step 320 to obtain the second set of voice triggers. The noise filter comprises a noise filter generated from at least one of a virtual white noise or a virtual brown noise.

Referring to FIG. 3, the step 330 may comprise at least one of the step 510 or the step 520. The step 510 and the step 520 may be performed sequentially or in a reverse order. The step 510 and the step 520 may be simultaneously performed.

Figure 6:
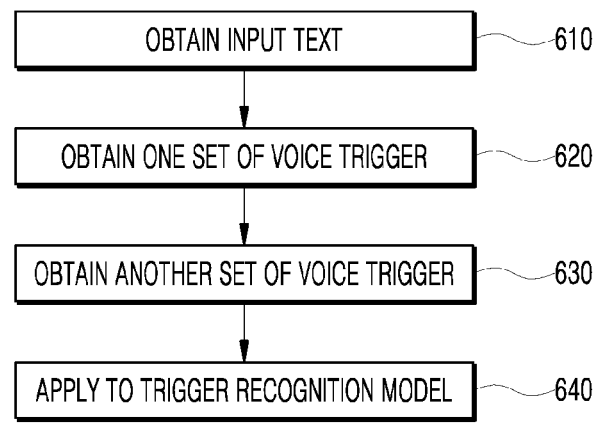
FIG. 6 is a view for explaining a process of generating a trigger recognition model according to an exemplary embodiment of the present disclosure.

FIG. 6 is a view for explaining a process of generating a trigger recognition model according to an exemplary embodiment of the present disclosure.

A method for generating a trigger recognition model for a robot according to an additional exemplary embodiment comprises a step 610 of obtaining an input text which expresses a voice trigger, a step 620 of obtaining one set of voice triggers from the input text through voice synthesis, a step 630 of obtaining another set of voice triggers by applying a filter in accordance with a mechanism characteristic of the robot to one set of voice triggers, and a step 640 of applying one set of voice triggers and the other set of voice triggers to the trigger recognition model as learning data for the voice trigger.

In the step 610, the controller 250 may control the input interface 210 or the communication interface 230 to obtain an input text which expresses a voice trigger.

In the step 620, the controller 250 may obtain one set of voice triggers from the input text obtained in the step 610 by the voice synthesis. The step 620 corresponds to the step 320 which has been described above with reference to FIG. 3.

In the step 630, the controller 250 may obtain another set of voice triggers by applying a filter in accordance with the mechanism characteristic of the robot to one set of voice triggers obtained in the step 620. The filter in accordance with the mechanism characteristic of the robot comprises a mechanism characteristic impulse response filter. In the step 630, the controller 250 may convolute the mechanism characteristic impulse response filter on one set of voice triggers obtained in the step 620 to obtain another set of voice triggers. The step 630 is similar to the step 340 which has been described above with reference to FIG. 3 in that a filter in accordance with the mechanism characteristic of the robot is applied. The mechanism characteristic impulse response filter is a filter representing a response on a predetermined impulse output from speakers disposed in different directions with different distances relative to a current position of the robot. The controller 250 may play a sine sweep through speakers disposed in various directions with various distances relative to the current position of the robot and deconvolute the original sweep from the sound recorded in the microphone of the robot to obtain a response for the predetermined impulse.

Figure 7:
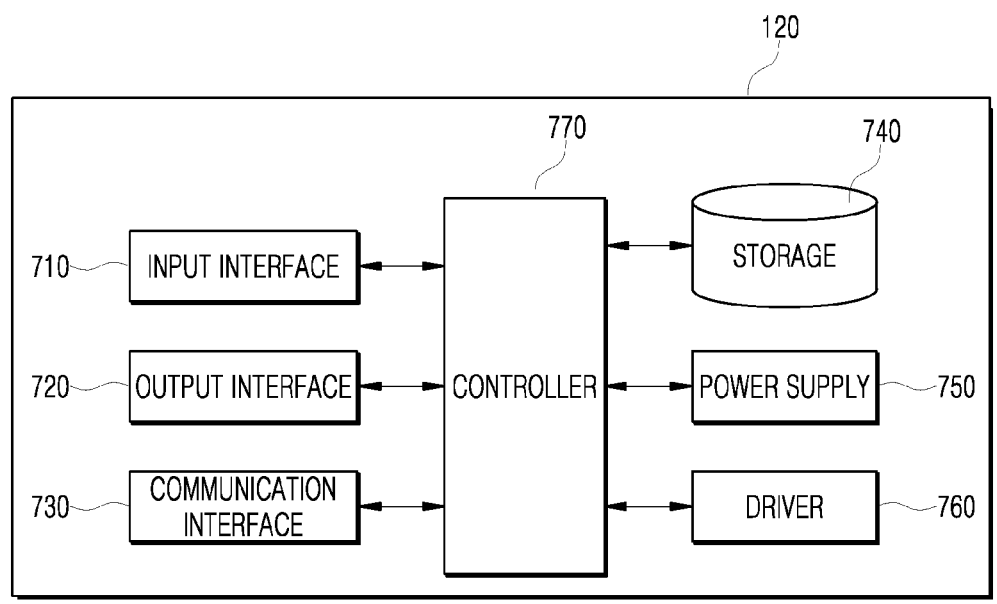
FIG. 7 is a block diagram illustrating a configuration of a robot according to an exemplary embodiment of the present disclosure.

FIG. 7 is a block diagram illustrating a configuration of a robot 120 according to an exemplary embodiment of the present disclosure.

The robot 120 may comprise an input interface 710, an output interface 720, a communication interface 730, a storage 740, a power supply 750, a driver 760, and a controller 770. Components illustrated in FIG. 7 are not essential for implementing the robot 120 so that the robot 120 described in this specification may comprise more components or fewer components than the above-described components.

The input interface 710 may comprise a text input interface to which a text is input. The controller 770 generates a trigger recognition model based on an input text obtained by the input interface 710.

The input interface 710 may comprise a microphone which may obtain an impulse response in accordance with a mechanism characteristic. The input interface 710 may further obtain a room impulse response in accordance with the environmental factor and the noise through the microphone.

The output interface 720 which generates an output related to vision or auditory may comprise a speaker. The output interface 720 may output a predetermined impulse for measuring an impulse response filter in accordance with the mechanism characteristic of the robot under the control of the controller 770. The controller 770 may control the input interface 710 to obtain a response for the impulse output from the output interface 720.

The output interface 720 may comprise a display. The display may form a mutual layer structure with a touch sensor or be formed integrally to be implemented as a touch screen. The touch screen may serve as a user input interface which provides an input interface between the robot 120 and the user and the touch screen may provide an output interface between the robot 720 and the user.

The communication interface 730 may comprise one or more wired/wireless communication modules which enable the communication between the robot 120 and an electronic device including a communication module. The communication interface 730 may comprise a wired communication module, a mobile communication module, and a near-field communication module.

The controller 770 may control the communication interface 730 to communicate with the terminal 110 to obtain an input text which expresses the voice trigger. The controller 770 may control the communication interface 730 to transmit the input text and the impulse response in accordance with the mechanism characteristic obtained from the input interface 710 to the electronic device 100. The controller 770 may control the communication interface 730 to receive at least one set of voice triggers obtained by the electronic device 100. The controller 770 may control the communication interface 730 to receive the trigger recognition model generated by the electronic device 100. The controller 770 may comprise one or more processors. The storage 740 may comprise memory that is coupled to the one or more processors of the controller 770 and provides the one or more processors with instructions which when executed cause the one or more processors to process the procedures as programmed by the instructions.

The trigger recognition model may be mounted in the robot 120. The trigger recognition model may be implemented by hardware, software, or a combination of hardware and software. When a part or all of the model is implemented by software, one or more commands which configure the trigger recognition model may be stored in the storage 740.

The controller 770 may comprise a learning processor for learning the trigger recognition model configured by an artificial neural network using the learning data. In this case, the learning processor may determine optimized model parameters of the artificial neural network by repeatedly training the artificial neural network to generate a trigger recognition model.

The storage 740 may store the trigger recognition model. Further, the storage 740 may store various data used to generate a trigger recognition model. The storage 740 may store a plurality of application programs driven in the robot 120, applications, and data and commands for an operation of generating a trigger recognition model. For example, the storage 740 may store at least one set of voice triggers provided as learning data for generating a trigger recognition model. For example, the storage 740 may store an input text obtained by the input interface 710 and the impulse response in accordance with a mechanism characteristic. For example, the storage 740 may store a filter in accordance with an environmental factor. At least some of application programs may be downloaded through wireless communication.

The power supply 750 is applied with external power and internal power to supply the power to each component of the robot 120, under the control of the controller 770. The power supply 750 comprises a battery. The battery may be an internal battery or a replaceable battery. The battery may be charged by a wired or wireless charging method and the wireless charging method may comprise a magnetic induction method or a self-resonance method.

The driver 760 is a module which drives the robot 120 and may comprise a driving mechanism and a driving motor which moves the driving mechanism.

The controller 770 corresponds to a controller which controls the above-described components in various manners.

Specifically, the controller 770 may control the input interface 710 to obtain an input text which expresses a voice trigger. The controller 770 may control the input interface 710 and the output interface 720 to obtain the impulse response in accordance with the mechanism characteristics.

The controller 770 may transmit the obtained input text and the impulse response filter in accordance with the mechanism characteristic to the electronic device 100 through the communication interface 730 and receive at least one set of voice triggers from the electronic device 100. For example, the controller 770 may obtain the first set of voice triggers which is generated by the electronic device 100 through the voice synthesis. The controller 770 may obtain a second set of voice triggers which is generated by the electronic device 100 by applying a filter in accordance with the environmental factor to the first set of voice triggers. The filter in accordance with the environmental factor may comprise at least one of a room impulse response filter or a noise filter. The controller 770 may obtain a third set of voice triggers which is generated by the electronic device 100 by applying an impulse response filter which is obtained by outputting a predetermined impulse in accordance with the mechanism characteristic of the robot to the second set of voice triggers. Here, the impulse response filter is a filter representing a response on a predetermined impulse output from speakers disposed in different directions with different distances relative to a current position of the robot 120. The controller 770 may apply the first, second, and third sets of voice triggers to the trigger recognition model stored in the storage 740 as learning data for the voice trigger.

The controller 770 may directly generate at least one voice trigger based on the input text and the impulse response filter in accordance with the mechanism characteristic. For example, the controller 770 may generate a first set of voice triggers by voice synthesis from the input text. The controller 770 may apply a filter in accordance with the environmental factor to the first set of voice triggers to generate a second set of voice triggers. The controller 770 may generate a third set of voice triggers by applying an impulse response filter which is obtained by outputting a predetermined impulse in accordance with the mechanism characteristic of the robot to the second set of voice triggers. The controller 770 may apply the first, second, and third sets of voice triggers to the trigger recognition model stored in the storage 740 as learning data for the voice trigger. The controller 770 may control the storage 740 to store the first, second, and third sets of voice triggers in the storage 240.

With the above-described configuration, the robot 120 provides the voice trigger which is obtained by phonetically synthesizing the input text to the trigger recognition model as learning data so that a trigger recognition model which may recognize various utterances for the same trigger may be easily generated. Further, a trigger recognition model suitable for the robot 120 can be generated only by measuring an impulse response for reflecting the mechanism characteristic of the robot 120 with different mechanism characteristics, so that the productivity may be improved.

However, the above-described present disclosure may be implemented in a program-recorded medium by a computer readable code. The computer-readable medium comprises all types of recording devices in which data readable by a computer system is stored. Examples of the computer readable medium may comprise a hard disk drive (HDD), a solid state disk (SSD), a silicon disk drive (SDD), ROM, RAM, CD-ROM, a magnetic tape, a floppy disk, an optical data storage device, and the like. Further, the computer may comprise the controller 250 of the electronic device 100 of the present disclosure and the controller 770 of the robot 120.

Although the specific exemplary embodiment of the present disclosure has been described and illustrated above, the present disclosure is not limited to the described exemplary embodiment. It may be understood by those skilled in the art that various modifications and changes may be made to another specific exemplary embodiment without departing from the spirit and scope of the present disclosure. Therefore, the scope of the present disclosure is not determined by the described exemplary embodiment, but may be determined by the technical spirit described in the claims.

What is claimed is:

1. A method for generating a trigger recognition model for a robot, the method comprising:
    obtaining an input text which expresses a voice trigger;
    obtaining a first set of voice triggers from the input text via voice synthesis;
    obtaining a second set of voice triggers by applying a first filter in accordance with an environmental factor to the first set of voice triggers;
    obtaining a third set of voice triggers by applying a second filter in accordance with a mechanism characteristic of the robot to the second set of voice triggers; and
    applying the first set of voice triggers, the second set of voice triggers, and the third set of voice triggers to the trigger recognition model as learning data for the voice trigger.

2. The method according to claim 1, wherein the voice trigger is a command which activates the robot.

3. The method according to claim 1, wherein, in the obtaining of the first set of voice triggers, the first set of voice triggers is obtained from the input text using an end-to-end neural network-based voice synthesis model.

4. The method according to claim 1,
    wherein the first filter comprises a room impulse response filter, and
    wherein, in the obtaining of the second set of voice triggers, the room impulse response filter is convolved with the first set of voice triggers to obtain the second set of voice triggers.

5. The method according to claim 4, wherein the room impulse response filter is a filter representing a response to a predetermined impulse measured by at least one combination of a microphone position and a speaker position.

6. The method according to claim 1,
    wherein the first filter comprises a noise filter, and
    wherein, in the obtaining of the second set of voice triggers, the noise filter is convolved with the first set of voice triggers to obtain the second set of voice triggers.

7. The method according to claim 6, wherein the noise filter comprises a noise filter generated from at least one of a virtual white noise or a virtual brown noise.

8. The method according to claim 1,
    wherein the second filter is a mechanism characteristic impulse response filter, and
    wherein, in the obtaining of the third set of voice triggers, the mechanism characteristic impulse response filter is convolved with the second set of voice triggers to obtain the third set of voice triggers.

9. The method according to claim 8, wherein the mechanism characteristic impulse response filter is a filter representing a response to a predetermined impulse output from speakers disposed in different directions with different distances relative to a current position of the robot.

10. A robot comprising:
    an input interface configured to obtain an input text which expresses a voice trigger;
    a storage configured to store a trigger recognition model;
    an output interface configured to output a predetermined impulse for measuring an impulse response filter in accordance with a mechanism characteristic of the robot; and
    at least one controller configured to:
    obtain a first set of voice triggers from the input text via voice synthesis;
    obtain a second set of voice triggers by applying a filter in accordance with an environmental factor to the first set of voice triggers;
    obtain a third set of voice triggers by applying the impulse response filter to the second set of voice triggers; and
    apply the first set of voice triggers, the second set of voice triggers, and the third set of voice triggers to the trigger recognition model as learning data for the voice trigger.

11. The robot according to claim 10, wherein the filter in accordance with the environmental factor comprises at least one of a room impulse response filter or a noise filter.

12. The robot according to claim 10, wherein the impulse response filter is a filter representing a response to the predetermined impulse output from speakers disposed in different directions with different distances relative to a current position of the robot.

13. The robot according to claim 10, wherein the trigger recognition model is an artificial intelligent learning model which is trained using an artificial neural network.

* * * * *